United States Patent
Al-Badran

(10) Patent No.: US 10,655,419 B2
(45) Date of Patent: May 19, 2020

(54) VEHICLE MOUNTED BLOWOUT PREVENTOR EQUIPMENT

(71) Applicant: Saudi Arabian Oil Company, Dhahran (SA)

(72) Inventor: Mohammed Saud Al-Badran, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 83 days.

(21) Appl. No.: 15/834,650

(22) Filed: Dec. 7, 2017

(65) Prior Publication Data

US 2018/0094500 A1    Apr. 5, 2018

Related U.S. Application Data

(63) Continuation-in-part of application No. 15/015,615, filed on Feb. 4, 2016, now Pat. No. 10,370,926, which is a continuation-in-part of application No. 14/499,833, filed on Sep. 29, 2014, now Pat. No. 9,869,149.

(51) Int. Cl.
*E21B 33/06* (2006.01)
*F16L 55/17* (2006.01)

(52) U.S. Cl.
CPC ............ *E21B 33/061* (2013.01); *F16L 55/17* (2013.01); *F16L 55/1715* (2013.01)

(58) Field of Classification Search
CPC ............................ E21B 33/061; E21B 33/062
See application file for complete search history.

(56) References Cited

U.S. PATENT DOCUMENTS

| 1,565,718 | A  | 12/1925 | Dorman |
| 3,554,480 | A  | 1/1971  | Rowe et al. |
| 4,171,142 | A  | 10/1979 | Harrison |
| 6,244,336 | B1 | 6/2001  | Kachich |
| 6,877,712 | B2 | 4/2005  | Wiedemann |
| 7,051,989 | B2 | 5/2006  | Springett et al. |
| 7,243,713 | B2 | 7/2007  | Isaacks et al. |

(Continued)

FOREIGN PATENT DOCUMENTS

| CN | 201779401 U | 3/2011 |
| CN | 103866065 A | 6/2014 |

(Continued)

OTHER PUBLICATIONS

The International Search Report and Written Opinion for related PCT application PCT/US2015/052590 dated Jan. 22, 2016.

(Continued)

*Primary Examiner* — Nicole Coy
(74) *Attorney, Agent, or Firm* — Bracewell LLP; Constance G. Rhebergen; Linda L. Morgan

(57) ABSTRACT

A leak containment system for sealing around a fluid flow member includes a ram sealing system mounted on a mobile vehicle. The ram sealing system has a sealing chamber having a generally cylindrical shape when the ram sealing system is in a closed position, and a ram assembly located at an end of the sealing chamber. The ram assembly has a pair of rams, each ram having an engaging surface, the engaging surface sized and shaped to seal around the fluid flow member. The ram assembly also has an actuating arm assembly connected to one of the rams and a ram body. The pair of rams is rotationally attached to the ram body.

17 Claims, 4 Drawing Sheets

(56) References Cited

U.S. PATENT DOCUMENTS

| | | | |
|---|---|---|---|
| 8,662,183 | B1 | 3/2014 | Vickio, Jr. |
| 8,881,829 | B2 | 11/2014 | Redden et al. |
| 9,038,727 | B2 | 5/2015 | Bisset |
| 9,115,563 | B2 | 8/2015 | Kotrla et al. |
| 9,260,932 | B2 | 2/2016 | Weir et al. |
| 2004/0108010 | A1 | 6/2004 | Gaston et al. |
| 2010/0051847 | A1 | 3/2010 | Mailand et al. |
| 2011/0030943 | A1 | 2/2011 | Le et al. |
| 2012/0073815 | A1 | 3/2012 | Springett et al. |
| 2012/0216901 | A1 | 8/2012 | Dickinson |
| 2013/0126030 | A1 | 5/2013 | Green et al. |
| 2013/0153241 | A1 | 6/2013 | Mallinson et al. |
| 2014/0209320 | A1 | 7/2014 | Le et al. |
| 2015/0300106 | A1 | 10/2015 | Martin et al. |
| 2016/0090809 | A1 | 3/2016 | Al-Badran |
| 2016/0153258 | A1 | 6/2016 | Al-Badran |

FOREIGN PATENT DOCUMENTS

| | | |
|---|---|---|
| JP | 54109624 A | 8/1979 |
| WO | 2015028651 A2 | 3/2015 |

OTHER PUBLICATIONS

The International Search Report and Written Opinion for related PCT application PCT/US2017/016158 dated Apr. 12, 2017.

VEHICLE MOUNTED BLOWOUT PREVENTOR EQUIPMENT

CROSS REFERENCE TO RELATED APPLICATIONS

This application is a continuation in part of co-pending U.S. application Ser. No. 15/015,615, titled "Apparatus And Method To Contain Flange, Pipe And Valve Leaks," filed Feb. 4, 2016, which is a continuation in part of U.S. application Ser. No. 14/499,833, titled "Scissor-Mechanism Closing Rams of Blow Out Preventors," filed Sep. 29, 2014, the disclosure of each of which is incorporated herein by reference in its entirety.

BACKGROUND OF THE DISCLOSURE

1. Field of the Disclosure

The present disclosure relates generally to fluid flow members carrying fluids for industrial processes, and more particularly to moveable systems and methods for operating rams to contain leaks of the fluid flow members.

2. Description of the Related Art

In many industrial processes, various fluids are delivered by way of pipeline systems. As an example, during hydrocarbon production, development, and distribution operations, hydrocarbons and other fluids flow through pipelines and valve assemblies, at times, at high pressure. Some wellheads, valves, flanges and flow line pipes can experience leaks that emit gasses and hydrocarbons to the environment and the atmosphere. Leaks can compromise the safety of people, facilities and the environment.

When a valve, pipe, flange, or other component of the fluid flow system leaks, the well or flowline may have to be shut in or the flow rate may have to be reduced until the leak is repaired. This results in costly downtime or reduction of operations until the cause of the leak can be identified and remedied.

SUMMARY OF THE DISCLOSURE

Embodiments of the present disclosure provide mobile systems and methods for containing a leak of a fluid flow member and isolating the leak until further repair can be completed safely, with minimum interruption to the flow rate. These systems and methods will isolate the leak so the industrial process can continue until operating conditions are more conducive to shutting down or reducing operations. Embodiments of this disclosure can also allow safe handling of a leak by allowing the leak to be contained by remote operations with a moveable unit that is capable of containing the leak without previous preparation of the fluid flow member for installing the leak containment system.

In an embodiment of this disclosure a leak containment system for sealing around a fluid flow member includes a ram sealing system mounted on a mobile vehicle. The ram sealing system has a sealing chamber having a generally cylindrical shape when the ram sealing system is in a closed position, and a ram assembly located at an end of the sealing chamber. The ram assembly has a pair of rams, each ram having an engaging surface, the engaging surface sized and shaped to seal around the fluid flow member. The ram assembly also has an actuating arm assembly connected to one of the rams and a ram body. The pair of rams is rotationally attached to the ram body.

In alternate embodiments, the leak containment system can further include an actuating arm assembly, where the pair of rams are rotationally attached to the actuating arm assembly. When the actuating arm assembly is in a contracted position, the ram sealing system can be in the closed position, and when the actuating arm assembly is in a spread position, the ram sealing system can be in an open position. The sealing chamber can be split longitudinally and one of the rams can be secured to the sealing chamber. The sealing chamber has chamber can have seals that seal mating surfaces of the sealing chamber when the ram sealing system is in the closed position. The sealing chamber can alternately be a seamless tubular member. When the ram sealing system is in the closed position, the engaging surface can be operable to seal against an operating pressure of the fluid flow member. When the engaging surface is an arc shaped seal and when the ram sealing system is in the closed position, the engaging surface can seal around an outer circumference of the fluid flow member.

In an alternate embodiment of this disclosure, a leak containment system for sealing around a fluid flow member includes a ram sealing system mounted on a mobile vehicle. The ram sealing system has a sealing chamber operable to maintain a seal around an outer diameter of the fluid flow member, the fluid flow member having a fluid flow path containing a fluid under pressure. A ram assembly is secured to each end of the sealing chamber. Each ram assembly has a pair of rams, each ram having an engaging surface, the engaging surface sized and shaped to seal around the fluid flow member, where one of the rams of each ram assembly is connected to the sealing chamber. The ram assembly also has an actuating arm assembly connected to one of the rams and operable to move the ram between a spread position where the ram sealing system is in an open position and a contracted position where the ram sealing system is in a closed position. The ram assembly further has a ram body, the pair of rams being rotationally attached to the ram body.

In alternate embodiments, the sealing chamber can have chamber seals that seal against an operating pressure of the fluid flow member. When the ram sealing system is in the closed position, the engaging surface can be operable to seal against an operating pressure of the fluid flow member. The engaging surface can be an arc shaped seal and when the ram sealing system is in the closed position, the engaging surface can seal around an outer circumference of the fluid flow member.

In another alternate embodiment of this disclosure, a method for sealing around a fluid flow member with a leak containment system includes locating a ram sealing system mounted on a mobile vehicle proximate to the fluid flow member. The fluid flow member is circumscribed with a sealing chamber of the ram sealing system, the sealing chamber having a ram assembly located at an end of the sealing chamber, the ram assembly having a ram body and a pair of rams rotationally attached to the ram body. The pair of rams is actuated with an actuating arm assembly of the ram assembly to move the ram sealing system to a closed position so that an engaging surface of the rams seal around the fluid flow member, the actuating arm assembly being connected to one of the rams.

In alternate embodiments, actuating the pair of rams with the actuating arm assembly can include moving the actuating arm assembly between a spread position and a contracted position with an actuator member. The sealing chamber can have chamber seals that seal mating surfaces of the sealing chamber when the ram sealing system is in the closed position. When the ram sealing system is in the closed position, the engaging surface can be operable to seal against an operating pressure of the fluid flow member. The engaging surface can be an arc shaped seal and the method can further include sealing around an outer circumference of the fluid flow member when the ram sealing system is in the closed position.

BRIEF DESCRIPTION OF THE DRAWINGS

So that the manner in which the above-recited features, aspects and advantages of the embodiments of this disclosure, as well as others that will become apparent, are attained and can be understood in detail, a more particular description of the disclosure briefly summarized above may be had by reference to the embodiments thereof that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION

Embodiments of the present disclosure will now be described more fully hereinafter with reference to the accompanying drawings which illustrate embodiments of the disclosure. This disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art. Like numbers refer to like elements throughout, and the prime notation, if used, indicates similar elements in alternative embodiments or positions.

In the following discussion, numerous specific details are set forth to provide a thorough understanding of the present disclosure. However, it will be obvious to those skilled in the art that embodiments of the present disclosure can be practiced without such specific details. Additionally, for the most part, details concerning well drilling, reservoir testing, well completion and the like have been omitted inasmuch as such details are not considered necessary to obtain a complete understanding of the present disclosure, and are considered to be within the skills of persons skilled in the relevant art.

Figure 1:
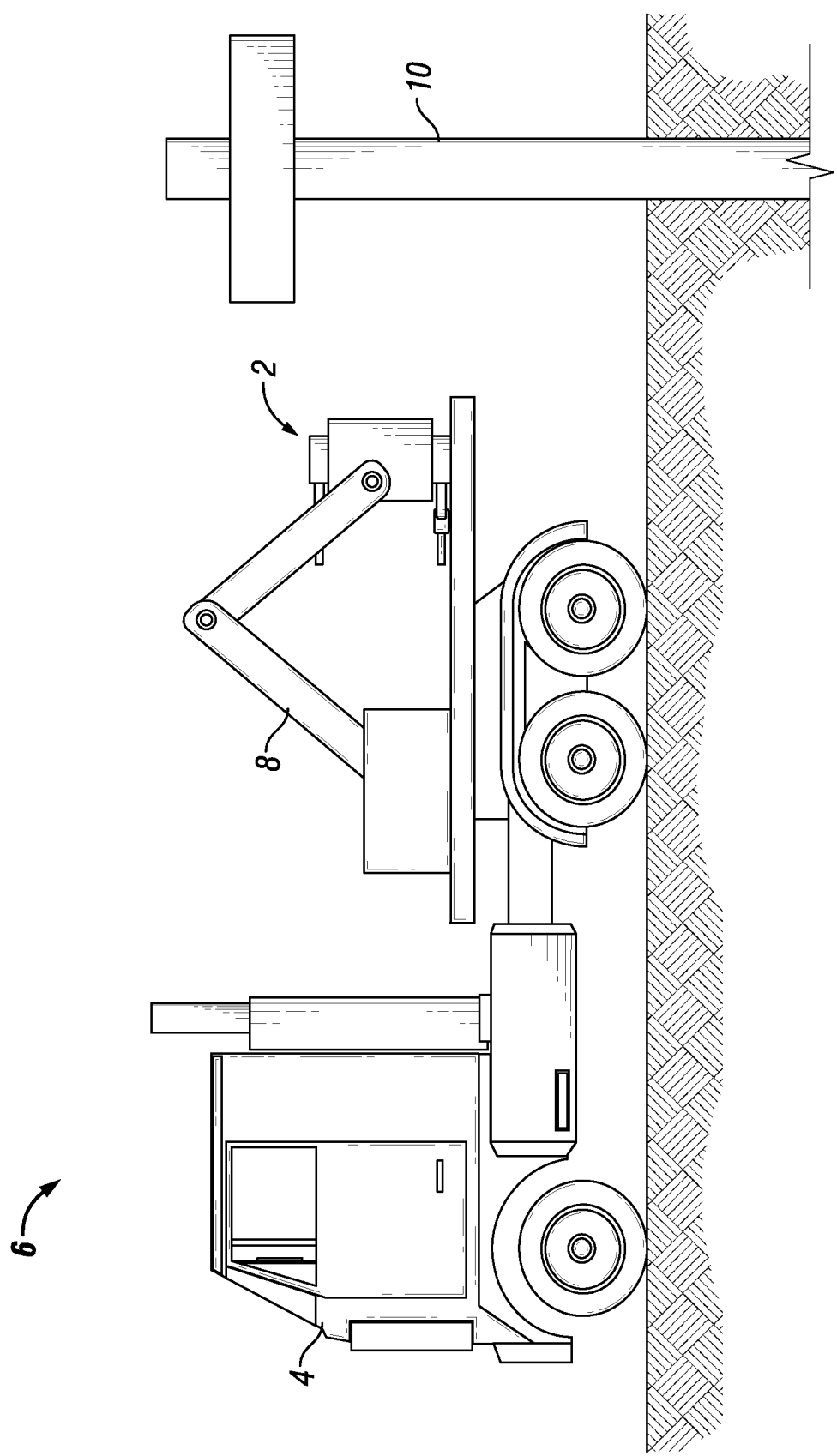
FIG. 1 is a schematic perspective view of a leak containment system with a mobile vehicle in accordance with an embodiment of this disclosure.

Looking at FIG. 1, ram sealing system 2 is mounted on mobile vehicle 4 to form leak containment system 6. Leak containment system 6 can also include a positioning device 8 that can be used to handle ram sealing system 2, such as for positioning ram sealing system 2 around fluid flow member 10. Positioning device 8 can be, for example, a crane, arms of a remotely operated vehicle, or other lifting device that can support and move ram sealing system 2. Positioning device 8 and ram sealing system 2 can be operated remotely at a sufficient distance away from ram sealing system 2 so that the operator of positioning device 8 is in a location away from the leak of fluid flow member 10. Ram sealing system 2 is a stand-alone portable unit and can be transported from site to site as needed.

Ram sealing system 2 can be used to seal around fluid flow member 10 to contain a leak of fluid flow member 10. Fluid flow member 10 can be a pipeline, valve, flange, or other member through which fluid flows. As an example, fluid flow member 10 can be associated with fluids flowing into or out of a subterranean well, or into or out of a fluid processing facility, such as a well or processing facility associated with hydrocarbon production operations. In the example embodiment of FIG. 1, ram sealing system 2 is oriented to close around a vertically oriented fluid flow member 10. In other embodiments, ram sealing system 2 can be oriented to close around horizontally oriented fluid flow member 10, or fluid flow member 10 that is oriented in a position between vertically and horizontally.

Figure 2:
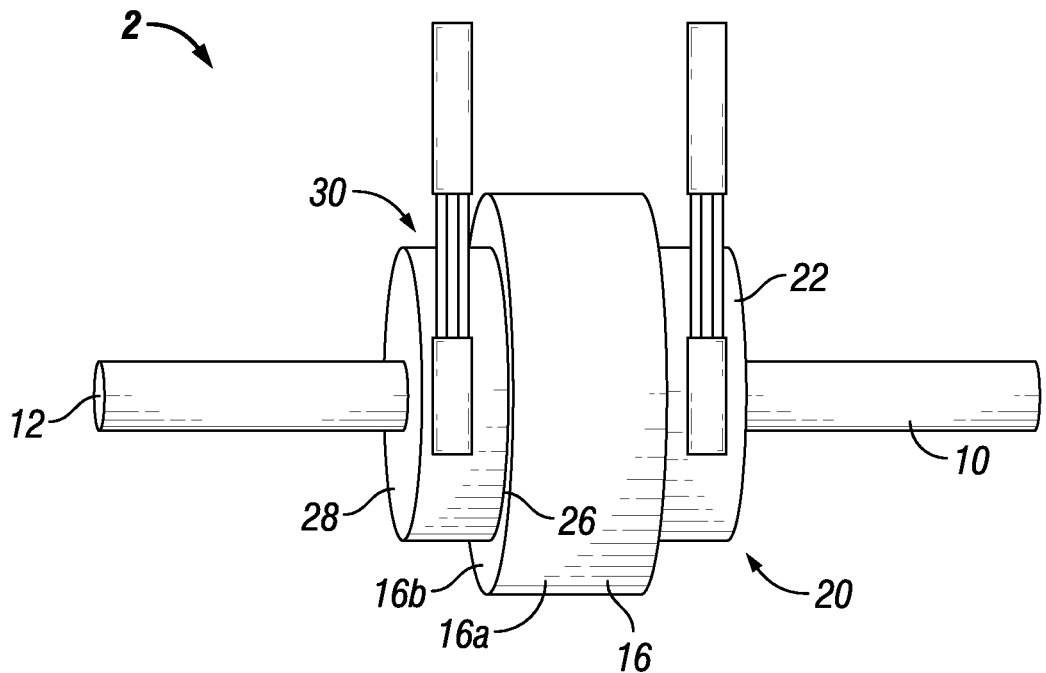
FIG. 2 is a schematic perspective view of a fluid flow member with a ram sealing system in accordance with an embodiment of this disclosure, shown with the ram closing device in the closed position.

Looking at FIG. 2, ram sealing system 2 is shown in a closed position around a portion of fluid flow member 10. Fluid flow member 10 has a fluid flow path 12. When fluid flow member 10 is a pipe, the main central bore of the pipe is the fluid flow path. When fluid flow member 10 is a valve or flange, the fluid flow path 12 can have alternate embodiments, such as a side port, bypass, annulus, or other known fluid path configuration.

Ram sealing system 2 can circumscribe fluid flow member 10 at a location of a leak and can provide sufficient sealing against the pressure of the fluid within fluid flow member 10 to maintain the integrity of the industrial operation until the leak can be fixed. As an example, ram sealing system 2 can contain the fluids within fluid flow member 10 and isolate a portion of fluid flow member 10.

Ram sealing system 2 includes sealing chamber 16. Sealing chamber 16 can include an outer surface portion 16a and a side portion 16b. Sealing chamber 16 can have an outer surface portion that is generally cylindrical in shape when ram sealing system 2 is in a closed position. As an example, outer surface portion 16a of sealing chamber 16 can be a seamless tubular member that is slid over an end of fluid flow member 10. The size of sealing chamber 16 can be selected based on the size of the leaking part of fluid flow member 10. Sealing chamber 16 can selectively have ports (not shown) to sample, inject, or bleed pressure from inside the closed system of fluid flow member 10 and sealing chamber 16.

Figure 6:
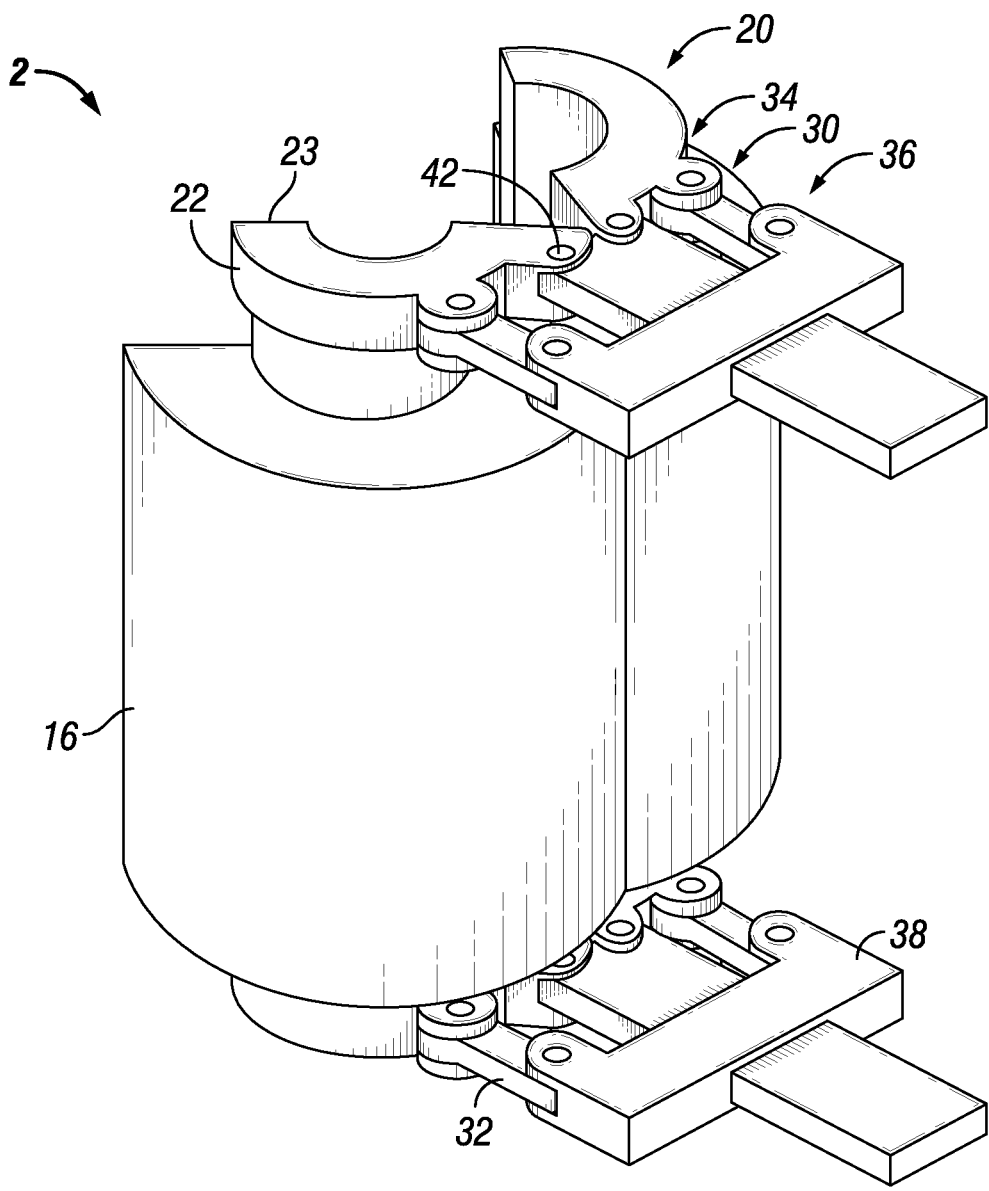
FIG. 6 is a schematic perspective view of a leak containment system in accordance with an embodiment of this disclosure.

Alternately, sealing chamber 16 can be split longitudinally so that sealing chamber 16 is formed of two or more segments that can seal together around fluid flow member 10, as shown in FIG. 6. Looking at FIG. 3, when sealing chamber 16 is a split member, chamber seals 18 mate when ram sealing system 2 is in the closed position. Chamber seals 18 can be located along mating surfaces of sealing chamber 16 so that as the segments of sealing chamber 16 come together, sealing chamber 16 can form a sealed body around fluid flow member 10.

Chamber seals 18a can be located both along mating surfaces of the generally flat side portions of sealing chamber 16 and chamber seals 18b can be located along the mating surfaces of the outer curved portion of sealing chamber 16. Chamber seals 18 provide sufficient sealing capabilities to seal against an operating pressure of fluid flow member 10. Chamber seals 18 can withstand high pressures and be H2S resistant. Ram assembly 20 is located at at least one end of sealing chamber 16. In the embodiments of FIG. 2, a ram assembly 20 is located at each end of sealing chamber 16. In the example embodiment of FIG. 3, ram assembly 20 is located at only one end of sealing chamber 16. The leak of fluid flow member 10 is isolated by the rams 22 and by chamber seals 18.

Figure 4:
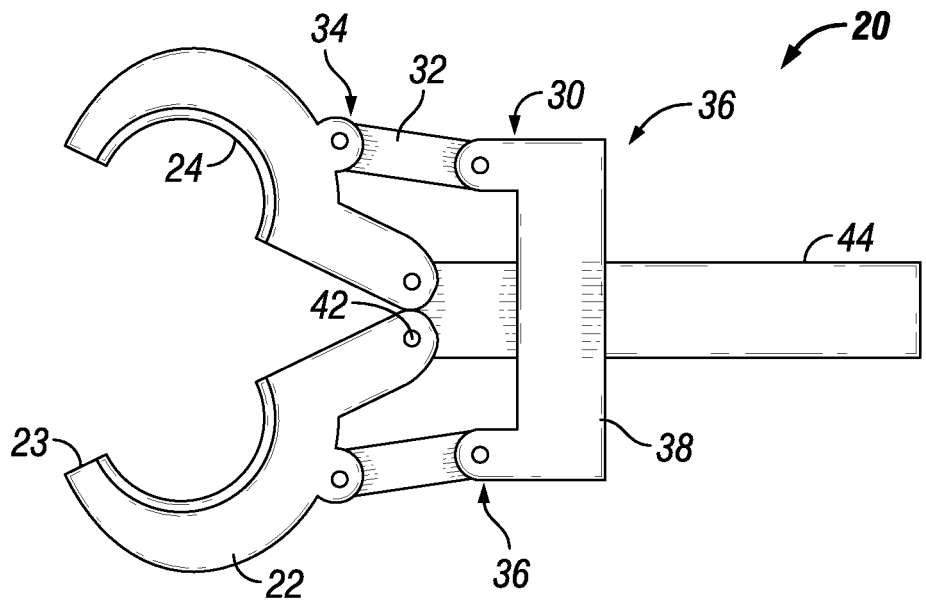
FIG. 4 is a schematic plan view of a ram assembly in accordance with an embodiment of this disclosure, shown with the rams in the open position.

Looking at FIG. 4, ram assembly 20 is shown as oriented when ram sealing system 2 is in an open position. In the example embodiment of FIG. 5, ram assembly 20 is shown as oriented when ram sealing system 2 is in the closed position. Looking at FIGS. 4-5, ram assembly 20 includes a pair of rams 22. When rams 22 are open, sealing chamber 16 is open to the environment, and sealing chamber 16 is closed to the environment when rams 22 are closed.

Each ram 22 has engaging surface 24. In certain embodiments, engaging surface 24 is sized and shaped to seal around fluid flow member 10. Engaging surface 24 can be operable to seal against an operating pressure of fluid flow member 10. Each engaging surface 24 can be an arc shaped seal that engages and seals around an outer circumference of fluid flow member 10 when ram sealing system 2 is in the closed position. In alternate embodiments, engaging surface 24 can include gripping parts, cutting parts, or any combination of sealing, gripping and cutting parts.

Looking at FIGS. 2-5, each ram 22 can have a general "C" shape with inner surfaces 23 that meet when rams 22 are in a closed position. In the open position, inner surfaces 23 are angled relative to each other. Surface seals 25 can seal between inner surfaces 23 when inner surfaces 23 meet. In alternate embodiments, engaging surface 24 can provide a sufficient seal around fluid flow member 10 so that surface seals 25 are not included. Each ram 22 can have an inner side 26 and an outer side 28. Inner side 26 can be secured to sealing chamber 16. Engaging surface 24 can be located closer to outer side 28 than inner side 26 so that engaging surface 24 can form a seal around fluid flow member 10 without interfering with, or being affected by, the closing of sealing chamber 16.

In embodiments where sealing chamber 16 is a split member, inner side 26 of each ram 22 is secured to sealing chamber 16 so that as each ram 22 moves to seal around fluid flow member 10, a segment of sealing chamber 16 moves with such ram 22. Each ram 22 is secured to a segment of sealing chamber 16 in a manner so that such ram 22 is static relative to such segment of sealing chamber 16 and so that the connection between such ram 22 and such segment of sealing chamber 16 is leak proof. In this way, when ram sealing system 2 is in the closed position, rams 22, which are fixed to the segments of sealing chamber 16, can maintain sufficient force on chamber seals 18 so that chamber seals 18 can seal against an operating pressure of fluid flow member 10.

In an alternate embodiment, when sealing chamber 16 includes a seamless tubular member, sealing chamber 16 is connected to rams 22. As an example, one of the rams 22 of each ram assembly 20 can be secured to sealing chamber 16.

The ram 22 that is secured to sealing chamber 16 is static relative to sealing chamber 16. The opposing ram 22 that is not secured to sealing chamber 16 moves relative to sealing chamber 16. When rams 22 rotate as ram sealing system 2 moves to the closed position, inner side 26 of sealing chamber 16 seals against side portion 16b of sealing chamber 16.

Ram assembly 20 also includes actuating arm assembly 30. Actuating arm assembly 30 is connected to at least one of the rams 22. Actuating arm assembly 30 can move between a spread position (FIG. 4) where the ram sealing system 2 is in an open position, and a contracted position (FIG. 5) where the ram sealing system 2 is in a closed position.

Figure 5:
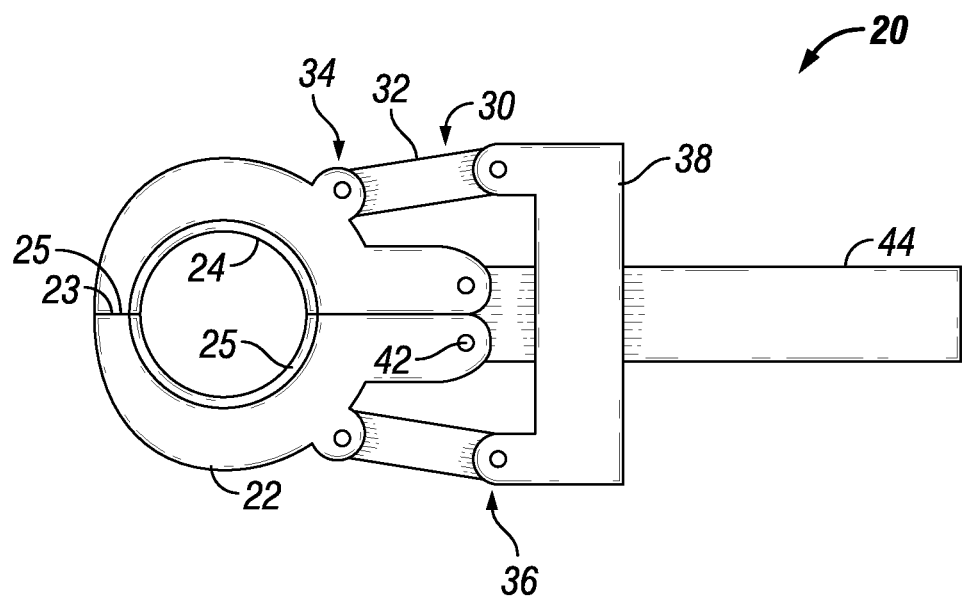
FIG. 5 is a schematic plan view of the ram assembly of FIG. 4, shown with the rams in the closed position.

Looking at FIGS. 4-5, actuating arm assembly 30 includes arm link 32. Arm link 32 has first end 34 rotationally attached to ram 22 and second end 36 rotationally attached to ram body 38. First end 34 can be rotationally attached to ram 22 with a pin that allows arm link 32 to rotate relative to ram 22. Second end 36 can be rotationally attached to ram body 38 with a pin that allows arm link 32 to rotate relative to ram body 38. Ram body 38 acts as a support structure for ram 22 and actuating arm assembly 30.

In order to move actuating arm assembly 30 between the spread position and the contracted position, actuator member 44 can be used. As actuator member 44 is moved linearly relative to ram body 38 at least one of the rams 22 pivot about pivot point 42 of actuator member 44. In the embodiment of FIGS. 4-5, each ram 22 has a separate pivot point 42. As ram 22 rotates about pivot point 42, ram sealing system 2 moves between an open position and a closed position. As actuator member 44 is moved in a direction towards rams 22, rams 22 rotate apart from each other so that actuating arm assembly 30 moves towards a spread position and ram sealing system 2 moves towards the open position of FIG. 4. As actuator member 44 is moved in a direction away from rams 22, rams 22 rotate towards each other so that actuating arm assembly 30 moves towards a contracted position and ram sealing system 2 moves towards the closed position of FIG. 5. Actuator member 44 can be moved, for example, with a pressurized fluid source, such as a hydraulic system.

In an example of operation, during industrial operations, such as those related to hydrocarbon development and distribution, an operator might at times experience a leak or discover a potential future leak point in a fluid flow member 10, such as pipeline, flange, or a valve assembly. When this occurs, the operator can utilize ram sealing system 2 of leak containment system 6 to contain the leak so that operations can continue at full capacity.

In order to deliver ram sealing system 2 to the desired location along fluid flow member 10, looking at FIG. 1, mobile vehicle 4 can transport ram sealing system 2 to the vicinity of fluid flow member 10. Mobile vehicle 4 can be operated remotely in full or in part so that the operator of mobile vehicle 4 can remain a safe distance away from fluid flow member 10.

With ram sealing system 2 in the open position and actuating arm assembly 30 in a spread position (FIGS. 4 and 6), an operator can guide ram sealing system 2 from a side opposite the leak or potential leak point so that sealing chamber 16 can at least partially located around fluid flow member 10 at the location of the leak or potential leak point. Ram sealing system 2 does not require any site preparation or particular attachment profile at the location of interest along fluid flow member 10.

When sealing chamber 16 is a segmented member, ram sealing system 2 can be used at any location along the fluid flow member 10 that is sized such that ram sealing system 2 can sealingly close around fluid flow member 10. When sealing chamber 16 is a segmented member, ram sealing system 2 does not require access to an end of fluid flow member 10.

When the leak is at a blind flange, valve component, or other fluid flow member with an accessible end, sealing chamber 16 can be a seamless tubular member that is sized to slide over an end of fluid flow member 10. In such an embodiment, one end of ram sealing system 2 can have a sealing chamber that is closed at one end hand has a single ram assembly 20 at an opposite end.

Figure 3:
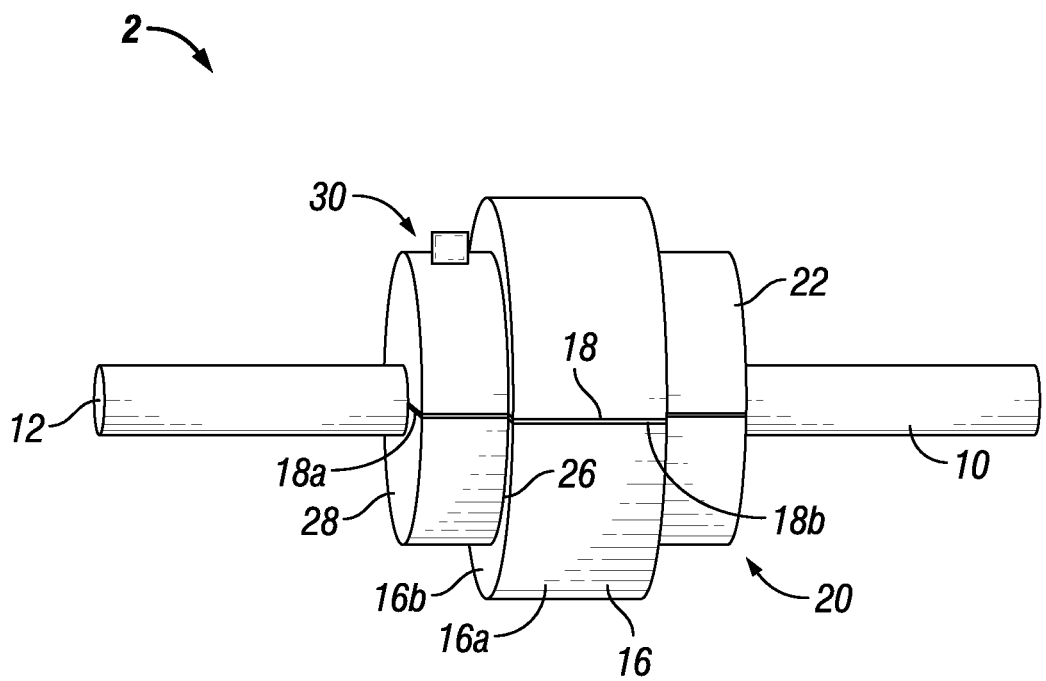
FIG. 3 is a schematic perspective view of the fluid flow member with a ram sealing system in accordance with an embodiment of this disclosure, shown with the ram closing device in the closed position.

Actuating arm assembly 30 is actuated with actuator member 44 so that actuating arm assembly 30 is moved to a contracted position to move ram sealing system 2 to the closed position (FIGS. 2, 3, and 5). As an example, a pressurized fluid can be supplied to a hydraulic system of actuator member 44 to move ram sealing system 2 to a closed position.

Sealing chamber 16 and rams 22 are sized to seal around the leak source of fluid flow member 10, with seals that are sized to seal around fluid flow member 10 and that are rated to contain the operating pressure of fluid flow member 10, including an appropriate safety margin. Sealing chamber 16 is large enough to contain the leak of fluid flow member 10. Ram sealing system 2 can be used as a temporary or semi-permanent solution to the leak or potential leak, until the weak point of fluid flow member 10 can be otherwise repaired. In certain embodiments, rams 22 can optionally be kept closed and sealing around fluid flow member 10 with pins (not shown) to keep the leak isolated in case the hydraulic source that is maintaining rams 22 closed flails.

In order to remove ram sealing system 2 from fluid flow member 10, actuator member 44 cam move ram sealing system 2 to the open position and ram sealing system 2 can be separated from fluid flow member 10.

Systems and methods disclosed herein can be used to rectify and regain control of leaking fluid flow member 10 before the leak deteriorates to disastrous situation. Depending on the particular situation, ram sealing system can be appropriately sized and can include gripping, sealing and cutting parts. Systems of this disclosure are mounted on mobile vehicle and operated remotely for improved safety compared to currently available systems. Embodiments of this disclosure can be used at any location along the fluid flow member without prior site preparation. It is vertically stacked so it can close on wellheads. Embodiments of this disclosure can be installed quickly since there are no connection members, such as bolts or other threaded members, that need to be made up.

Systems and methods of the present disclosure described herein, therefore, are well adapted to carry out the objects and attain the ends and advantages mentioned, as well as others inherent therein. While example embodiments of the disclosure have been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A leak containment system for sealing around a fluid flow member, the leak containment system having:
   a ram sealing system mounted on a mobile vehicle, the ram sealing system having:
      a sealing chamber having a generally cylindrical shape when the ram sealing system is in a closed position; and
      a ram assembly located at an end of the sealing chamber, the ram assembly having:
         a pair of rams, each ram having a pivot point and an engaging surface, the engaging surface sized and shaped to seal around the fluid flow member;
         an actuating arm assembly connected to each of the rams;
         a ram body, each of the rams being rotationally attached to the ram body; and
         an actuator member, each of the rams being rotationally attached to the actuator member at the pivot point of the ram so that each of the rams rotates about the pivot point of the ram as the actuator member is moved linearly relative to the ram body.

2. The leak containment system according to claim 1, where each of the rams are rotationally attached to the actuating arm assembly.

3. The leak containment system according to claim 1, where when the actuating arm assembly is in a contracted position, the ram sealing system is in the closed position, and when the actuating arm assembly is in a spread position, the ram sealing system is in an open position.

4. The leak containment system according to claim 1, where the sealing chamber is split longitudinally and one of the rams is secured to the sealing chamber.

5. The leak containment system according to claim 1, where the sealing chamber has chamber seals that seal mating surfaces of the sealing chamber when the ram sealing system is in the closed position.

6. The leak containment system according to claim 1, where the sealing chamber is a seamless tubular member.

7. The leak containment system according to claim 1, where when the ram sealing system is in the closed position, the engaging surface is operable to seal against an operating pressure of the fluid flow member.

8. The leak containment system according to claim 1, where when the engaging surface is an arc shaped seal and when the ram sealing system is in the closed position, the engaging surface seals around an outer circumference of the fluid flow member.

9. A leak containment system for sealing around a fluid flow member, the leak containment system having:
   a ram sealing system mounted on a mobile vehicle, the ram sealing system having:
      a sealing chamber operable to maintain a seal around an outer diameter of the fluid flow member, the fluid flow member having a fluid flow path containing a fluid under pressure;
      a ram assembly secured to each end of the sealing chamber, each ram assembly having:
         a pair of rams, each ram having a pivot point and an engaging surface, the engaging surface sized and shaped to seal around the fluid flow member, where one of the rams of each ram assembly is connected to the sealing chamber;
         an actuating arm assembly connected to one of the rams and operable to move the ram between a spread position where the ram sealing system is in an open position and a contracted position where the ram sealing system is in a closed position; and a ram body, each of the rams being rotationally attached to the ram body; where the actuating arm assembly includes an actuator member, each of the rams being rotationally attached to the actuator member at the pivot point of the ram so that each of the rams rotates about the pivot point of the ram as the actuator member is moved linearly relative to the ram body.

10. The leak containment system according to claim 9, where the sealing chamber has chamber seals that seal against an operating pressure of the fluid flow member.

11. The leak containment system according to claim 9, where when the ram sealing system is in the closed position, the engaging surface is operable to seal against an operating pressure of the fluid flow member.

12. The leak containment system according to claim 9, where the engaging surface is an arc shaped seal and when the ram sealing system is in the closed position, the engaging surface seals around an outer circumference of the fluid flow member.

13. A method for sealing around a fluid flow member with a leak containment system, the method including:

locating a ram sealing system mounted on a mobile vehicle proximate to the fluid flow member;

circumscribing the fluid flow member with a sealing chamber of the ram sealing system, the sealing chamber having a ram assembly located at an end of the sealing chamber, the ram assembly having a ram body and a pair of rams rotationally attached to the ram body;

actuating the pair of rams with an actuating arm assembly of the ram assembly to move the ram sealing system to a closed position so that an engaging surface of the rams seal around the fluid flow member, the actuating arm assembly being connected to one of the rams: where each of the rams has a pivot point and is rotationally attached to an actuator member at the pivot point of the ram so that each of the rams rotates about the pivot point of the ram as the actuator member is moved linearly relative to the ram body.

14. The method according to claim 13, where actuating the pair of rams with the actuating arm assembly includes moving the actuating arm assembly between a spread position and a contracted position with the actuator member.

15. The method according to claim 13, where the sealing chamber has chamber seals that seal mating surfaces of the sealing chamber when the ram sealing system is in the closed position.

16. The method according to claim 13, where when the ram sealing system is in the closed position, the engaging surface is operable to seal against an operating pressure of the fluid flow member.

17. The method according to claim 13, where the engaging surface is an arc shaped seal and the method further includes sealing around an outer circumference of the fluid flow member when the ram sealing system is in the closed position.

* * * * *